United States Patent

Kamiyama

Patent Number: 5,633,078
Date of Patent: May 27, 1997

[54] DECORATIVE FILM HAVING FOAMING LAYER

[75] Inventor: Keiju Kamiyama, Yamagata, Japan

[73] Assignee: Minnesota Mining and Manufacturing Company, Saint Paul, Minn.

[21] Appl. No.: 690,458

[22] Filed: Aug. 19, 1996

Related U.S. Application Data

[63] Continuation of Ser. No. 411,823, filed as PCT/US94/05024, May 2, 1994, published as WO94/29129, Dec. 22, 1994, abandoned.

[51] Int. Cl.$^6$ ................ B32B 7/12
[52] U.S. Cl. ............... 428/317.3; 428/317.7; 428/310.5; 428/354
[58] Field of Search ............. 428/317.3, 317.7, 428/310.5, 315.9, 354, 318.4, 319.3

[56] References Cited

U.S. PATENT DOCUMENTS

| | | | |
|---|---|---|---|
| 3,522,140 | 7/1970 | Hartzell et al. | 428/317.3 |
| 4,005,239 | 1/1977 | Davis et al. | 428/315 |
| 4,251,584 | 2/1981 | van Engelen et al. | 428/317.3 X |
| 4,329,386 | 5/1982 | Samowich | 428/196 |
| 4,409,275 | 10/1983 | Samowich | 428/138 |
| 4,828,881 | 5/1989 | Brown et al. | 428/208 |
| 5,034,269 | 7/1991 | Wheeler | 428/317.3 |
| 5,264,278 | 11/1993 | Mazurek et al. | 428/317.3 |

FOREIGN PATENT DOCUMENTS

2 167 683 A   6/1986   United Kingdom ............. D06N 3/06

OTHER PUBLICATIONS

JG 0023019–A Japanese Patent Publication Abstract.
JO4,052,119 Japanese Unexamined Patent Publication Abstract.
JG 1026,684A Japanese Patent Publication, Abstract.

*Primary Examiner*—Daniel Zirker
*Attorney, Agent, or Firm*—Gary L. Griswold; Walter N. Kirn; John H. Hornickel

[57] ABSTRACT

A decorative film comprising a decorative layer, an intermediate layer and a pressure sensitive adhesive layer, wherein the intermediate layer comprises foaming layers, and an expansion ratio on the decorative layer side is higher than an expansion ratio on the tackifier layer side.

19 Claims, No Drawings

DECORATIVE FILM HAVING FOAMING LAYER

This is a continuation of application Ser. No. 08/411,823, filed as PCT/US94/05024, May 2, 1994, published as WO94/29129, Dec. 22, 1994, now abandoned.

TECHNICAL FIELD

This invention relates to a decorative film that absorbs irregularities of a substrate and provides a smooth outer surface appearance.

BACKGROUND OF THE INVENTION

In decorative films according to the art, appearance of a film surface is likely to be affected by any irregularity of a substrate. To obtain a smooth surface appearance, a substrate must be finished extremely smoothly and this surface adjustment of the substrate requires an extremely long period of time.

Wall paper having both of a foaming layer and a non-foaming layer has been known in the past. However, most of such products are not directed to absorb any irregularity of the substrate and moreover, due to their structures, they do not exhibit the functions of absorbing irregularity of the substrate and providing a smooth surface.

Japanese Unexamined Utility Model Publication (KOKAI) No. 58-89331 describes wall paper produced by laminating glass paper or a backing sheet comprising a non-woven fabric, a foamable vinyl chloride resin layer, a surface pattern, and optionally, a transparent vinyl chloride sol layer and a transparent acrylic film, in this order. This wall paper is directed to improve staining resistance, and the reference does not mention the thickness of the foaming layer for absorbing irregularity of the foundation. This wall paper is not believed to play the function of absorbing irregularity of the substrate in view of the materials of the backing sheet.

Japanese Patent Publication (KOKAI) No. 60-23019 describes a method of producing a decorative sheet which comprises coating a paste sol containing a foaming agent to the entire surface, or a part, of a substrate, dissolving the paste sol at a temperature at which the foaming agent is not degraded, printing twice thereon a second layer having a low melt viscosity equal to, or lower than, that of the layer containing the foaming agent, printing a third layer, if necessary, and thereafter raising the temperature to the decomposition temperature of the foaming agent and generating foaming. In this case, foaming is exclusively directed to obtain a frosted surface. Therefore, a foaming ratio is low and the function of absorbing irregularity of the substrate cannot be attained.

Japanese Unexamined Patent Publication (KOKAI) No. 452199 describes a decorative sheet obtained by disposing a decorative layer on the surface of a substrate sheet, laminating a first pressure sensitive adhesive layer, an intermediate layer consisting of a soft material (a foaming material) and a second pressure sensitive adhesive layer on the back of the substrate sheet in this order, and further laminating peel paper on the back. In this sheet, the foaming layer as the intermediate layer absorbs irregularity of the substrate. Accordingly, irregularity of the substrate does not extend to the plastic substrate sheet. However, since two layers of pressure sensitive adhesive layers are provided, the structure is complicated and the problem of adhesion remains between the layers. Peel strength is not sufficient, either, and a complicated production process is necessary because the pressure sensitive adhesive must be coated on both surfaces of the foaming layer.

SUMMARY OF THE INVENTION

The present invention provides a decorative film comprising a decorative layer, an intermediate layer and a pressure sensitive adhesive layer, which is characterized in that the intermediate layer comprises a foaming layer whose expansion ratio on the side of the decorative layer is higher than an expansion ratio on the side of the pressure sensitive adhesive layer.

Advantageously, the present invention provides a decorative sheet that can absorb any irregularity of the substrate, has high adhesion between the layers and a high peel strength, and can be produced through a simple production process.

A flat decorative surface can be obtained on a substrate having irregularity without carrying out substrate treatment. In comparison with conventional foaming layers which are uniformly foamed as a whole, the inter-mediate layer of the present invention has by itself a higher strength, and the foaming layer is not destroyed when the decorative film is peeled. Therefore, the decorative film can be bonded once again easily.

In another preferred embodiment of the present invention, the intermediate layer described above comprises a foaming layer and a non-foaming layer, the foaming layer is disposed on the side of the decorative layer and the nonfoaming layer is disposed on the side of the pressure sensitive adhesion layer.

Since the decorative film of the present invention has the foaming layer satisfying the requirements described above, it can well absorb irregularity of the substrate, provides a smooth surface shape, and does not impede the irregularity absorbing function of the foaming layer. Since the sheet of the present invention has the non-foaming layer or a layer having low expansion ratio between the foaming layer and the pressure sensitive adhesive layer, the foaming layer is not broken at the time of peeling, and has a high peel strength. The sheet of the present invention can be rebonded.

Furthermore, the foaming layer of the sheet of the present invention is formed by heating and foaming while the foaming material is sandwiched between the surface decorative layer and the non-foaming layer. For this reason, the foaming layer having a uniform thickness can be formed extremely easily.

DESCRIPTION OF THE PREFERRED EMBODIMENT(S)

Hereinafter, the present invention will be explained in further detail.

Decorative Layer:

The surface decorative layer of the film of the present invention aims at obtaining staining proofness, wearing resistance and a decorative property, and various plastic films such as polyvinyl chloride, polyester, acrylic resin, etc, can be used for this purpose. Further, a colored layer may be disposed on the upper or lower layer of the film by printing, coating or laminating other films. If the decorative film is flexible as a whole, the film becomes more advantageous. Therefore, a semi-rigid vinyl chloride film is used.

Intermediate Layer:

The intermediate layer used for the decorative film of the present invention comprises a differential foamed layer, and its characterizing feature resides in that there is a difference of expansion ratios between the expansion ratio on the side of the decorative layer and the expansion ratio on the side of the pressure sensitive adhesive layer. The intermediate layer may comprise a foaming layer and a non-foaming layer. The intermediate layer having the difference of the expansion ratios can be produced definitely in the following way.

(a) The intermediate layer comprises a plurality of layers, and a foaming agent having a different expansion ratio is used for each of these layers, or the amount of addition of the foaming agent is changed for each layer, so as to change the expansion ratios of the intermediate layer.

(b) The intermediate layer comprises a plurality of layers, and a foaming treating temperature of each of the layers is changed so as to change the expansion ratios of the intermediate layer.

(c) Two or more kinds of foaming agents having different specific gravity and expansion ratios are used so as to provide in advance the difference of concentrations of the foaming agents in the intermediate layer. Foaming is then effected so as to change the expansion ratios of the intermediate layer.

Next, the reason why the expansion ratio of the intermediate layer is made high on the decorative layer side and low on the pressure sensitive adhesive layer side will be explained. The expansion ratio of the intermediate layer is made high on the side of the decorative layer so as to effectively absorb irregularity of a substrate. Accordingly, an expansion ration of at least 4 times is preferred as the expansion ratio of the intermediate layer on the decorative layer side.

The expansion ratio of the intermediate layer is set to a low ratio on the pressure sensitive adhesive layer side, or in other words, foaming is restricted. If the expansion ratio is high, the pressure sensitive adhesive layer cannot be laminated uniformly, so that appearance of the decorative film will be spoiled or the coating amount of the pressure sensitive adhesive becomes locally insufficient and the decorative film will peel. Therefore, the expansion ratio of the intermediate layer is preferably less than 4 times on the pressure sensitive adhesive layer side.

Next, the material of the intermediate layer will be explained. The material of the intermediate layer used in the present invention is not particularly limited. More definitely, a urethane resin, a vinyl chloride resin, a polyethylene resin, and so forth, can be used.

In view of the application of the decorative film, it is preferred to impart flame retardancy to the film and for this purpose, a predetermined amount of a flame retarding agent such as a bromo type, a phosphorus type, etc., may be added appropriately.

Particularly preferred is the vinyl chloride resin because the resin itself has predetermined flame retardancy and this material is advantageous in both weatherability and economy. Among them, a vinyl chloride resin having a mean degree of polymerization of 700 to 1,000 is preferred because it has a low melt viscosity and can cause uniform foaming.

In the present invention, a predetermined amount of a plasticizer can be added to the main materials, and this is important so as to lower the melt viscosity and to generate uniform foaming at the time of foaming. More definitely, though a phthalic acid type plasticizer and a polyester type plasticizer can be used, a DINP, etc., is particularly suitable because they have high compatibility with the vinyl chloride resin in the foaming layer and even a small amount can effectively lower the melt visocity.

In the present invention, materials for the foamed layer comprises 40 to 70 parts by weight, more preferably 45 to 55 parts by weight of plasticizer relating to 100 parts by weight of a resin such as polyvinyl chloride. In the case where an amount of the plasticizer less than 40 parts by weight, a melting viscosity of the polyvinyl chloride is too high resulting in difficulty of foaming. On the other hand where an amount of the plasticizer is more than 70 parts by weight, strength of the foamed layer is deficient. Moreover, the reason why an amount of 45 to 55 parts by weight is preferable is because in this range, foaming is homogeneously carried out, and transfer of plasticizer can be efficiently prevented.

Next, according to the present invention, the kind of plasticizer is not limited, but DINP is preferable in that it is highly compatible to polyvinyl chloride and foaming is homogeneously carried out.

A filler, a pigment, a stabilizer, etc, can be further added to the material of the intermediate layer depending on the intended application of the decorative film.

When the intermediate layer comprises the foaming layer and the non-foaming layer in the present invention, different kinds of materials can be used for these layers. For example, a film of a polyester resin, an acrylic resin, a urethane rein, a polypropylene resin, or the like, can be used for the non-foaming layer, or a laminate obtained by dissolving such resins in a solvent can also be used. However, to effectively prevent inter-layer peel between the foaming layer and the non-foaming layer, the foaming layer and the non-foaming layer may be made of the same kind of the material.

To obtain uniform foaming, the foaming layer is preferably heated over two stages. In such a case, primary heating (e.g., at 150°±10±° C.) is first carried out for drying the foaming layer, and after the non-foaming layer is coated on the foaming layer, secondary heating (e.g., 200°±10° C.) is then carried out for drying the non-foaming layer and for foaming.

In such a case, therefore, foaming can be effected more uniformly at a higher melt viscosity of the non-foaming layer during secondary heating. When the vinyl chloride resin is used for the non-foaming layer, for example, the resin having a mean degree of polymerization of 1,500 to 3,000 is preferably used.

Conventional foaming agents can be used as the foaming agent of the present invention. For example, it is preferred to use organic foaming agents such as dinitroisopentamethylene tetramine, azodicarbonamide, azobisisobutylonitrile, P,PI-oxybis-benzenesulfonyl hydrazide, para-toluenesulfonyl hydrazide, benzenesulfonyl hydrazide, and so forth. The amount of the foaming agent is from 1 to 5 wt % on the basis of the amount of the foaming material and is preferably from 2 to 4 wt %. If the amount of the foaming agent is too low, foaming does not occur sufficiently, and if the amount it too high, foaming becomes non-uniform and the problem such as breakage of the foaming layer will occur.

Next, the thickness of the intermediate layer will be explained. The thickness of the intermediate layer can be determined in accordance with a cushion effect, the total thickness, bonding power, and so forth, but is preferably from 0.5 to 1.1 mm. If the thickness is less than 0.5 mm, the cushion effect will be insufficient and irregularity of the adhered cannot be absorbed effectively.

If the thickness exceeds 1.1 mm, on the other hand, the total thickness of the decorative film becomes so great that it cannot satisfy Class 2 (400 g/m$^2$) of the Inspection Standard of Wall Decorative Association (Wall Material No. 0003) and the strength of the intermediate layer itself tends to drop.

When the intermediate layer comprises the foaming layer and the non-foaming layer, the foaming layer preferably has a thickness of 0.5 to 1.0 mm and the non-foaming layer preferably has a thickness of 0.05 to 0.1 mm. If the thickness of the non-foaming layer is smaller than 0.05 mm, irregularity of the foaming layer cannot be smoothed sufficiently, the pressure sensitive adhesive layer cannot be laminated uniformly. When the surface coarseness of the foaming layer is evaluated from a sectional photograph, it is around 0.04 mm at an expansion ratio of about 10 times.

The reason why the thickness of the non-foaming layer is defined to be below 0.1 mm is because if the thickness exceeds 0.1 mm, uniform foaming of the foaming layer becomes difficult to occur, the total thickness becomes great, and production becomes more difficult. In other words, the nonfoaming layer preferably provides a predetermined effect at a minimum necessary thickness.

Pressure Sensitive Adhesive Layer:

The pressure sensitive adhesive layer in the present invention is a pressure sensitive adhesive layer which enables the decorative film to be bonded to an any adherend, and various pressure sensitive adhesives as an acryl type adhesive, a silicone type adhesive, a vinyl acetate type adhesive, and so forth, can be used. To secure an air passage between the substrate (adherent) surface and the surface of the pressure sensitive adhesive and to eliminate air, this pressure sensitive adhesive can contain flexible microspheres.

It is possible to use, as the materials of such flexible microspheres, an acrylic resin, silicone resin, a urethane resin, a vinyl acetate resin, a Teflon resin, a polyamide resin, a vinyl chloride resin, a styrene resin, a phenol resin, an epoxy resin, a styrene-butadiene-styrene block copolymer resin, a styrene-ethylene-butylene-styrene block copolymer resin, styrene-isoprene-styrene block copolymer, an NBR, a chlorprene rubber, a natural rubber, and so forth.

The production method of the flexible microspheres is not particularly limited, and they can be produced by suspension polymerization, emulsion polymerization, seed polymerization, and so forth.

The volume average diameter of the flexible microspheres is at least 100 μm (number average diameter of 50 μm) and is preferably about 150 μm (number average diameter of 100 μm). When the volume average diameter is smaller than 100 μm, air between the adhered and the adhesive sheet cannot be removed effectively.

In the decorative film of the present invention, peel paper can be further laminated below the pressure sensitive adhesive layer, whenever necessary.

Production Method:

Finally, the production method of the decorative film according to the present invention will be explained. However, this is just an example of the production method of the present invention and is in no way limitative.

An example of the production method comprises coating a vinyl chloride resin incorporating a predetermined amount of a foaming agent and a solvent to the back of a film for decoration to a thickness of about 0.1 mm using a knife coater, and heating and drying the resin at a temperature of for example 150°±10° C. for one minutes in an oven. Next, vinylchloride to which a half of the predetermined amount of foaming agent is coated with a knife coater.

Next, heating and drying are carried out at 200°±10° C. for two minutes in the oven to cause foaming. A tackifier layer is coated by a knife coater or laminated by a laminator on the non-foaming layer to produce the decorative film of the present invention.

Peel paper, etc., can be further laminated, whenever necessary.

Next, the production method of the decorative film whose intermediate layer comprises the foaming layer and the nonfoaming layer according to another embodiment of the present invention will be explained.

First of all, a vinyl chloride resin incorporating a predetermined amount of a foaming agent and a solvent is coated to the back of a film for decoration to a thickness of about 0.15 mm by a knife coater, and primary heating is carried out at 150°±100° C. for one minute in an oven. Next, a vinyl chloride resin for a non-foaming layer is coated to a thickness of about 0.05 mm on the vinyl chloride resin described above using a knife coater, and secondary heating is carried out at 200°±100° C. for two minutes in an oven so as to complete foaming.

A pressure sensitive adhesive layer is then coated on the non-foaming layer by a knife coater or is laminated by a laminator. There is thus produced the decorative film of the present invention.

Having the intermediate layer satisfying the requirements described above, the decorative film according to the present invention can well absorb irregularity of the adherend, provides a smooth decorative surface shape and makes it possible to dispose a uniform pressure sensitive adhesive layer. Accordingly, a more uniform decorative back shape can be obtained, and partial peel of the decorative film does not occur.

In comparison with the foaming layer according to the prior art which is uniformly foamed as a whole, the intermediate layer of the present invention has by itself higher strength, and the foaming layer is not broken at the time of peeling of the decorative film. Therefore, the decorative film can be bonded once again.

In the decorative film of the present invention, it is also possible to dispose the intermediate layer comprising the foaming layer and the non-foaming layer in this case, the foaming layer can be heated and foamed while it is sandwiched between the decorative layer and the non-foaming layer, so that foaming can be effected more uniformly, and a decorative film having an extremely uniform thickness can be obtained.

EXAMPLES

Next, the present invention will be explained further definitely with reference to Examples and Comparative Examples.

Materials used in Examples are as follows:
DOP—Shin Nippon Rika (K.K.) Sansosyzer DOP
DUP—Shin Nippon Rika (K.K.) Sansosyzer DUP
DINP—Mitsubishi Kasei Vinyl (K.K.) DINP
Thermostabilizer—Asahidenka (K.K.) Adecastab FL-44
Foaming agent—Otsuka kagaku (K.K.) Unifoam AZH-25
Titanium Oxide—Du Pont R-960 (white pigment)
Vinyl chloride resin—Kanegahuchi Kagaku Kogyo (K.K.) Kanevinyl paste PSL-280

Example 1

A film containing 25 parts by weight, on the basis of 100 parts by weight of vinyl chloride, of a phthalic acid type plasticizer (DUP) and having a thickness of about 0.1 mm was used as a surface decorative layer, and were disposed sequentially below this surface decorative layer, a foaming layer comprising a resin containing 50 parts by weight, on the basis of 100 parts by weight of the vinyl chloride resin, of a phthalic acid type plasticizer DINP and having a thickness of 0.3 mm, 0.5 mm, 0.7 mm, 0.8 mm, 1.0 mm or 1.1 mm, a non-foaming layer containing 25 parts by weight, on the basis of 100 parts by weight of the vinyl chloride resin, of a phthalic acid type plasticizer DUP and having a thickness of 0.06 mm, and an acrylic type tackifier having a 0.03 mm, in this order. These layers were laminated at room temperature using a laminator to obtain each predetermined sample. on the other hand, test substrates were produced by scattering small amounts of abrasive grains #60 and #100 according to JIS R 6001 on a flat aluminum sheet in order to examine whether or not irregularity resulting from the abrasive grains affected flatness of the surface decorative layer. The test results are tabulated in Table 1.

TABLE 1

| Thickness of | Particle size of abrasive grains | |
| --- | --- | --- |
| Foaming Layer | #60 | #100 |
| No foaming layer | x | x |
| 0.3 mm | x | x |
| 0.5 mm | x | Δ |
| 0.7 mm | Δ | o |
| 0.8 mm | Δ | o |
| 1.0 mm | Δ | o |
| 1.1 mm | Δ | o | x Irregularity is clearly observed on decorative surface
Δ Irregularity is slightly observed on decorative surface
o Irregularity is not substantially on decorative surface It is clear that thickness of about 0.5 mm is necessary to adequately absorb the irregularity.

Example 2

A film containing 25 parts by weight, on the basis of 100 parts by weight of vinyl chloride, of a phthalic acid type plasticizer (DOP) and having a film thickness of about 0.1 mm was used as a surface decorative layer, and were disposed sequentially below this surface decorative layer a foaming layer comprising a resin having added thereto 50 parts by weight, on the basis of 100 parts by weight of vinyl chloride, of a phthalic acid type plasticizer DINP and having a thickness of about 1 mm, and a non-foaming layer containing 25 parts by weight, on the basis of 100 parts by weight of the vinyl chloride resin, of a phthalic acid type plasticizer DOP and having a thickness of 0.03 mm, 0.05 mm or 0.07 mm. Further, an acrylic type tackifier was laminated. Each of the belt-like samples having a width of 25 mm and a length of 200 mm was bonded on the pressure sensitive adhesive surfaces thereof at the central portion having a length of about 100 mm, and both end portions were pulled by hand and rapidly peeled. Then, the condition of the adhesive surfaces was evaluated. The results are tabulated in Table 2.

TABLE 2

| Thickness of non-foaming layer | Condition of layers (peel layer) |
| --- | --- |
| without foaming layer | destruction of foaming layer |
| 0.03 mm | inter-layer peel between non-foaming layer and tackifier |
| 0.05 mm | peel between adhesive and adhesive (no inter-layer peel |

TABLE 2-continued

| Thickness of non-foaming layer | Condition of layers (peel layer) |
| --- | --- |
| 0.07 mm | peel between adhesive and adhesive (no inter-layer peel) |

When the non-foaming layer existed or the non-foaming layer is less than 0.05 mm thickness, the foaming layer was broken and could not exhibit sufficient bonding power. When the thickness was less than 0.05 mm, flatness was not sufficient, and the pressure sensitive adhesive was more likely to undergo inter-level peeling. Accordingly, it was found that a non-foaming layer having a thickness of about 0.05 mm was necessary.

Example 3

A film containing 30 parts by weight, on the basis of 100 parts by weight of a vinyl chloride resin, of a phthalic acid type plasticizer DUP and having a thickness of 0.1 mm was used as a decorative layer, and there was disposed below this film an intermediate layer consisting of a resin having added thereto 50 parts by weight of a phthalic acid type plasticizer DINP and comprising foaming layers having high and low expansion ratios, tabulated in Table 3.

After a 0.05 mm-thick acrylic type pressure sensitive adhesive was further laminated below the intermediate layer, the test was carried out in the same way as in Examples 1 and 2. The test results are tabulated in Table 3.

TABLE 3

| Foaming layer having high expansion ratio | | Foaming layer having low expansion layer | | | | Condition |
| --- | --- | --- | --- | --- | --- | --- |
| thickness (mm) | ratio | thickness (mm) | ratio | #60 | 100 | after peel |
| 1.0 | 3 | 0.05 | 2 | x | Δ | Peel between adhesive and adhesive (no inter-level peel) |
| 1.0 | 4 | 0.05 | 2 | o | o | Peel between adhesive and adhesive (no inter-layer peel) |
| 1.0 | 6 | 0.01 | 2 | o | o | Peel between adhesive and adhesive (no inter-layer peel) |
| 1.0 | 10 | 0.1 | 5 | o | o | Destruction of foaming layer |

The pressure sensitive adhesive surface had high flatness and the foaming layers were not broken when the foaming layer having a high expansion ratio had an expansion ratio of at least 4 times and the foaming layer having a low expansion ratio had an expansion ratio of less than 4 times.

I claim:

1. A decorative film comprising a decorative layer, an intermediate layer and a pressure sensitive adhesive layer, wherein said intermediate layer comprises a foaming layer and two sides, and an expansion ratio on the side of said decorative layer is made higher than an expansion ratio on the side of said pressure sensitive adhesive layer.

2. A decorative film according to claim 1, wherein said expansion ratio of said intermediate layer is at least 4 times on the side of said decorative layer and is less than 4 times on the side of the said pressure sensitive adhesive layer.

3. A decorative film according to claim 1 wherein said intermediate layer comprises a foaming layer and a non-foaming layer, said foaming layer is disposed on the side of said decorative layer and said non-foaming layer is disposed on the side of said pressure sensitive adhesive layer.

4. A decorative film according to claim 1, wherein a principal component of said intermediate layer comprises a vinyl chloride resin.

5. A decorative film according to claim 1, wherein the pressure sensitive adhesive layer contains elastic microspheres having a number average diameter of 50 to 100 µm.

6. A decorative film according to claim 3, wherein the thickness of said foaming layer is from 0.5 to 1.0 mm, and the thickness of said non-foaming layer is from 0.05 to 1.0 mm.

7. A decorative film according to claim 2 wherein said intermediate layer comprises a foaming layer and a non-foaming layer, said foaming layer is disposed on the side of said decorative layer and said non-foaming layer is disposed on the side of said pressure sensitive adhesive layer.

8. A decorative film according to claim 2, wherein a principal component of said intermediate layer comprises a vinyl chloride resin.

9. A decorative film according to claim 3, wherein a principal component of said intermediate layer comprises a vinyl chloride resin.

10. A decorative film according to claim 2, wherein the pressure sensitive adhesive layer contains elastic microspheres having a number average diameter of 50 to 100 µm.

11. A decorative film according to claim 3, wherein the pressure sensitive adhesive layer contains elastic microspheres having a number average diameter of 50 to 100 µm.

12. A decorative film according to claim 4, wherein the pressure sensitive adhesive layer contains elastic microspheres having a number average diameter of 50 to 100 µm.

13. A decorative film according to claim 4, wherein the thickness of said foaming layer is from 0.5 to 1.0 mm, and the thickness of said non-foaming layer is from 0.05 to 0.10 mm.

14. A decorative film according to claim 5, wherein the thickness of said foaming layer is from 0.5 to 1.0 mm, and the thickness of said non-foaming layer is from 0.05 to 0.10 mm.

15. A decorative film comprising a decorative layer, an intermediate layer having two sides, and a pressure sensitive adhesive layer, wherein said intermediate layer comprises a foaming layer on one side and a non-foaming layer on the second side, said foaming layer is disposed on the side of said decorative layer and said non-foaming layer is disposed on the side of said pressure sensitive adhesive layer.

16. The decorative film according to claim 15, wherein said expansion ratio of said intermediate layer is at least 4 times on the side of said decorative layer and is less than 4 times on the side of said pressure sensitive adhesive layer.

17. The decorative film according to claim 15, wherein a principal component of said intermediate layer comprises a vinyl chloride resin.

18. The decorative film according to claim 15, characterized in that the pressure sensitive adhesive layer contains elastic microspheres having a number average diameter of 50 to 100 µm.

19. The decorative film according to claim 15, wherein the thickness of said foaming layer is from 0.5 to 1.0 mm, and the thickness of said non-foaming layer is from 0.05 to 0.10 mm.

* * * * *